Nov. 16, 1954     T. L. TRAFFORD     2,694,609
INTERLOCKING CONNECTING TABLE
Filed Sept. 22, 1953
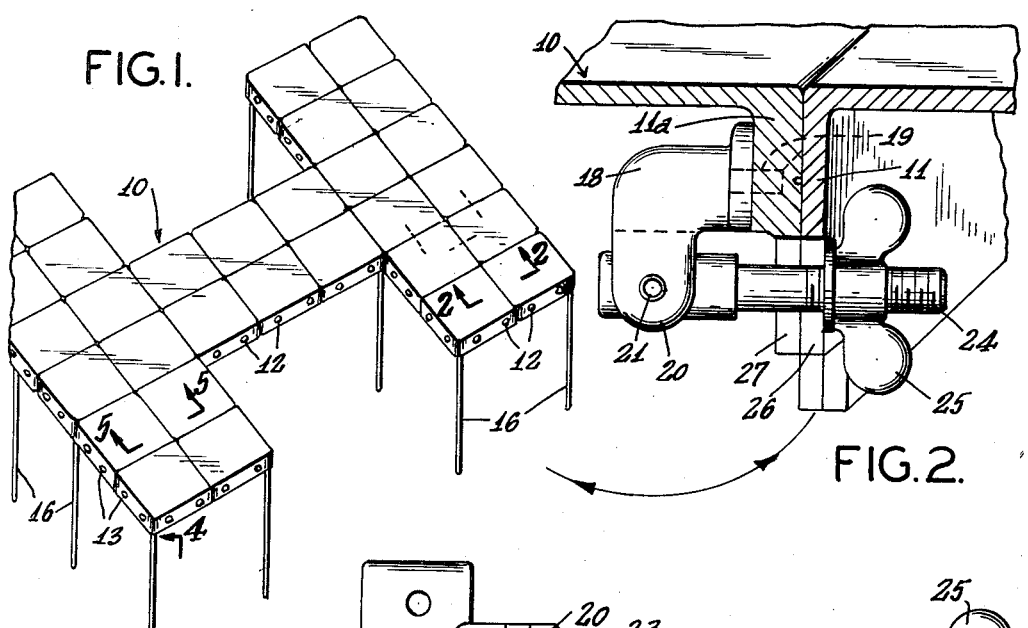
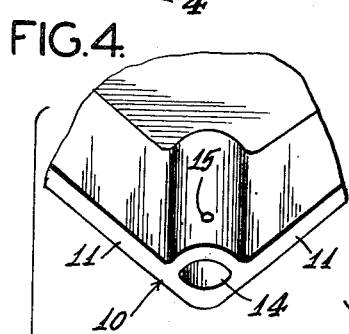
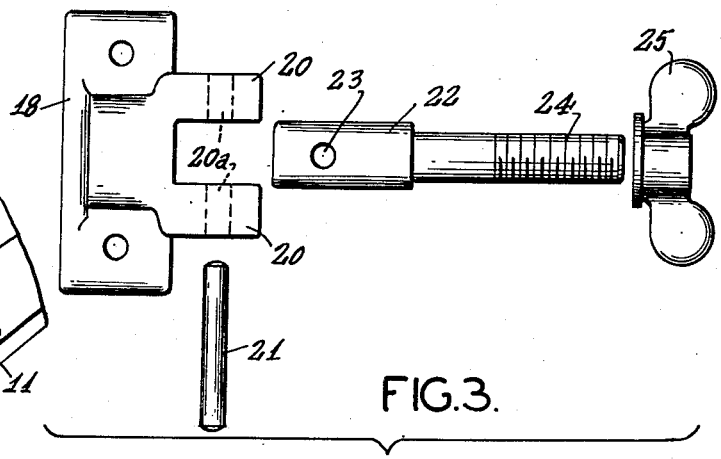
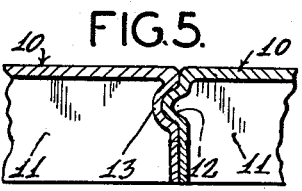
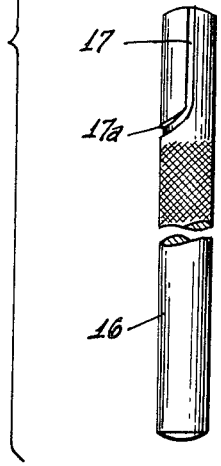
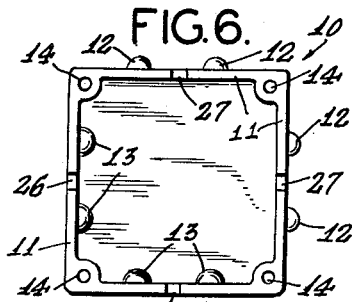
INVENTOR.
THOMAS L. TRAFFORD
BY
H. G. Manning
ATTORNEY.

United States Patent Office 2,694,609
Patented Nov. 16, 1954

2,694,609

INTERLOCKING CONNECTING TABLE

Thomas L. Trafford, Cheshire, Conn.

Application September 22, 1953, Serial No. 381,648

1 Claim. (Cl. 311—4)

This invention relates to furniture, and more particularly to a knock down table which may be built up from a plurality of square units having interfitting concave and convex dimples on the abutting flanges thereof, and having releasable hinged locking devices connecting said abutting flanges.

One object of the present invention is to provide a table of the above nature which will be simple in construction, inexpensive to manufacture, easy to install and manipulate, compact, requiring only a small storage space, ornamental in appearance, and very efficient and durable in use.

With these and other objects in view, there has been illustrated on the accompanying drawing, one form in which the invention may conveniently be embodied in practice.

In the drawing,

Fig. 1 represents a perspective view of an assembled table built up from a plurality of individual square units, and having a plurality of legs detachably connected to some of said units, said table having a typical shape in the form of an H.

Fig. 2 is a cross-sectional view, taken along the line 2—2 of Fig. 1, showing one of the two hinged devices attached to each unit for connecting the abutting flanges of two adjacent units.

Fig. 3 is an exploded top view of one of the locking devices, shown by itself.

Fig. 4 is a bottom perspective fragmentary view of the corner of one of the table units and a supporting leg in separated relation, prior to its insertion into a corner socket of said table.

Fig. 5 is a cross-sectional fragmentary view, taken along the line 5—5 of Fig. 1, and showing the spherical shape of the interfitting dimple and recess on the abutting flanges of a pair of adjacent table units.

Fig. 6 is a bottom plan view of one of the square units, shown on a larger scale, showing the arrangement of circular convex dimples and circular concave recesses on the side flanges thereof.

Fig. 7 is an end view of the same.

Referring now to the drawing, in which like reference numerals denote corresponding parts throughout the several views, the numeral 10 indicates one of the individual units, which is square in shape, having thin depending flanges 11 integrally connected therewith. Two of the adjacent flanges 11 of each unit 10 are provided with a pair of convex spherical dimples 12, and the two other adjacent side flanges 11 have a pair of concave spherical recesses 13 located in alignment with the dimples on the flanges of the adjacent unit 10, when said units are assembled in abutting relation.

In each corner of the table units 10, provision is made of a vertical bottom opening socket 14 having an inwardly projecting horizontal pin 15 for detachable engagement within a bayonet slot 17 at the top of a table leg 16. The slot 17 has a bottom inclined cam section 17a.

In order to detachably lock the pair of abutting depending flanges of each of the adjacent units 10 together, provision is made of an angle bracket 18 secured to a thickened section 11a of one of the flanges 11, by means of a pair of headed screws 19, 19. The angle bracket 18 is provided with a depending lug 20 which is bifurcated, as clearly shown in Fig. 3, and provided with a pair of horizontal aligned holes 20a, for receiving a horizontal pin 21, which serves pivotally to connect said bracket 18 to a clamping arm 22, having a horizontal cylindrical aperture 23 embracing the pivot pin 21. The location of three of such clamping arms are shown by dotted lines in Fig. 1.

The clamping arm 22 is also provided with a reduced threaded section 24, which is adapted to pass freely through a pair of vertical slots 26, 27 in the flanges 11 of the adjacent unit 10.

The abutting flanges 11 of the pair of adjacent units may be locked detachably together by means of a thumb nut 25 screwed upon the threaded section 24.

*Operation*

In operation, when the leg 16 is inserted in the socket 14, the cam 17a on the end of the slot 17 serves to engage the pin 15 with a binding locking action.

It will be understood that a number of table units may be assembled in any relation to produce any desired size or shape of table, such as a T, or U, as well as the H-shaped table as shown in Fig. 1.

While there has been disclosed in this specification one form in which the invention may be embodied, it is to be understood that this form is shown for the purpose of illustration only, and that the invention is not limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

In a knockdown article of furniture, a plurality of square units having depending flanges extending around all of the four edges thereof, said units being assembled together in interlocking connected arrangement in a group with the flanges on adjacent edges in abutting relation, said abutting flanges having interfitting dimples and sockets respectively, one of each pair of abutting flanges being provided with an angle bracket having a bifurcated depending section, a horizontal pivot pin mounted in the side of said bifurcated section and a locking arm mounted to swing on said pin within a pair of slots formed in the flanges of the adjacent units, and a thumb nut secured on the free end of said arm to lock said abutting flanges tightly together.

References Cited in the file of this patent

UNITED STATES PATENTS

| Number | Name | Date |
|---|---|---|
| 1,051,983 | Brown | Feb. 4, 1913 |
| 1,331,862 | Claus | Feb. 24, 1920 |
| 1,389,008 | Poble, Jr. | Aug. 30, 1921 |
| 2,101,573 | Cramer et al. | Dec. 7, 1937 |
| 2,403,338 | Butler | July 2, 1946 |
| 2,447,141 | Shillady | Aug. 17, 1948 |
| 2,484,283 | Gilbert et al. | Oct. 11, 1949 |
| 2,489,933 | Schwarz, Jr. | Nov. 29, 1949 |
| 2,596,663 | Duffy | May 13, 1952 |